United States Patent [19]

Ruehle

[11] 4,146,871
[45] Mar. 27, 1979

[54] DETERMINATION OF REFLECTIVITY AND WATER DEPTH FOR FIRING MARINE SOURCES AS AN INVERSE DISTORTION OPERATOR

[75] Inventor: William H. Ruehle, Duncanville, Tex.

[73] Assignee: Mobil Oil Corporation, New York, N.Y.

[21] Appl. No.: 844,550

[22] Filed: Oct. 25, 1977

Related U.S. Application Data

[63] Continuation-in-part of Ser. No. 709,485, Jul. 28, 1976, abandoned, which is a continuation-in-part of Ser. No. 554,047, Feb. 28, 1975, abandoned.

[51] Int. Cl.² .......................... G01V 1/04; G01V 1/38
[52] U.S. Cl. .................................... 340/7 R; 181/110; 181/111; 181/120
[58] Field of Search ........... 340/7 R, 15.5 F, 15.5 CP; 181/110, 111, 118, 120

[56] References Cited

U.S. PATENT DOCUMENTS

| | | | |
|---|---|---|---|
| 3,278,893 | 10/1966 | Silverman | 340/7 R |
| 3,353,624 | 11/1967 | Redding | 340/7 R |
| 3,365,697 | 1/1968 | Fail et al. | 340/15.5 F |
| 3,489,996 | 1/1970 | Moon et al. | 340/15.5 F |
| 3,581,274 | 5/1971 | Ruehle | 340/15.5 F |
| 3,687,218 | 9/1972 | Ritter | 340/7 R |
| 3,689,874 | 9/1972 | Foster et al. | 340/15.5 F |
| 3,893,539 | 7/1975 | Mott-Smith | 340/7 R |
| 4,038,630 | 7/1977 | Chelminski | 340/7 R |

FOREIGN PATENT DOCUMENTS

1193507  6/1970  United Kingdom ................... 340/7 R

OTHER PUBLICATIONS

"Water Reverberations-Their Nature and Elimination", Geophysics, vol. 24, No. 2, Apr. 1959, pp. 233-261, by M. Backus.
"Spectra of Water Reverberations for Primary and Multiple Reflections", Geophysics, vol. 37, No. 5, Oct. 1972, pp. 788-796, by Pflueger.

Primary Examiner—Maynard R. Wilbur
Assistant Examiner—Lawrence Goodwin
Attorney, Agent, or Firm—C. A. Huggett; George W. Hager, Jr.

[57] ABSTRACT

In marine seismic exploration, seismograms recording reflected energy generated from the firing of a seismic source are used to measure the characteristics of the medium through which the energy passes. These measurements are converted into control parameters for an array of seismic sources. When the array is fired under control of these parameters, seismograms having enhanced reflections are produced. As an example, at least one seismic source is fired to produce seismograms which are used in the measurement of water bottom reflectivity and water depth. The measured reflectivity and water depth are converted into a time domain operator representative of the inverse of the reverberation distortion in the water layer. An array of sources is then fired in a sequence which produces an acoustic pressure wave having the inverse time domain characteristics.

6 Claims, 13 Drawing Figures

DETERMINATION OF REFLECTIVITY AND WATER DEPTH FOR FIRING MARINE SOURCES AS AN INVERSE DISTORTION OPERATOR

CROSS REFERENCES TO RELATED APPLICATIONS

This application is a continuation-in-part of U.S. patent application Ser. No. 709,485, filed July 28, 1976, now abandoned, which in turn is a continuation-in-part of U.S. patent application Ser. No. 554,047, filed Feb. 28, 1975, and now abandoned.

BACKGROUND OF THE INVENTION

This invention relates to marine seismic exploration and more particularly to the use of parameters measured from conventionally produced seismograms to control the firing of an array of sources to produce seismograms with enhanced reflections.

Figure 1:
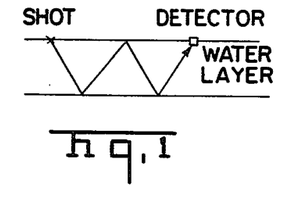
FIG. 1 depicts water bottom multiples.
Figure 2:
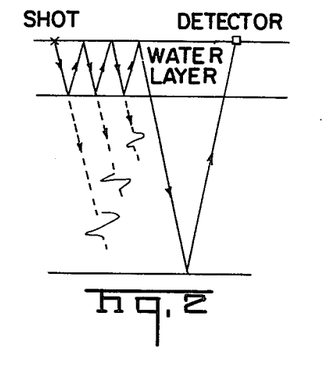
FIGS. 2 and 3 depict water reverberations.
Figure 3:
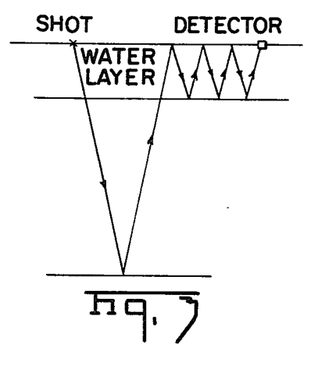

In marine seismic exploration, seismic energy can be generated from a towed array of sources. The resultant acoustic pressure waves are reflected from the subsurface formations and recorded as seismograms. Unfortunately, the seismograms include distortion which obscures the characteristics of the subsurface formations. In marine exploration, this distortion is often severe. It includes water bottom multiples as depicted in FIG. 1 and reverberations as depicted in FIGS. 2 and 3.

As the initial shot pulse travels to the bottom of the water, it is partially transmitted and partially reflected by this boundary. This transmitted part is reflected by the discontinuity beneath the water to become a primary reflection. The reflected part bounces back to the surface where it is again reflected to the water bottom. Once more, part of this pulse passes through the boundary and part is reflected. The process continues indefinitely. Each time a pulse bounces between the surface and the bottom of the water, a pulse emerges from the boundary at the bottom to follow the initial pulse into the section. These multiple pulses are delayed equal time intervals relative to each other, and their amplitudes are successively reduced by the reflection coefficient at the bottom of the water. The net result of this is to produce a seismogram consisting of a single primary followed by a train of equally spaced multiples or reverberations.

In U.S. Pat. No. 3,689,874 to Foster et al there is described a method and apparatus for removing the reverberation distortion present in seismic data by an operation which separates the reverberation distortion component of the data from the component representing the characteristics of the subsurface formation. This operation is known as dereverberation and more particularly involves the obtaining of a dereverberation operator in the form of an inverse filter that is applied to the seismic data to produce a signal which approximates the signal which would have been produced by a desired shot pulse interacting with the reflectivity of the subsurface formation in the absence of the reverberation distortion.

While dereverberation has been successfully used on many marine seismograms, it is not effective in all areas. Particularly where the water bottom is hard, the reverberations are so severe that the complete dynamic range of the recording system is required just to faithfully record the reverberations. Accordingly, it is desirable to suppress the reverberations before recording.

SUMMARY OF THE INVENTION

This invention relates to marine seismic exploration wherein the characteristics of the medium through which the seismic energy travels are measured from conventionally produced seismograms. These measurements are converted into control parameters. When the sources are fired under control of these parameters, seismograms having enhanced reflections are produced.

More particularly, this invention relates to measuring the reflectivity of the water bottom and the two-way travel time $T_w$ directly from seismograms produced by conventional shooting of at least one seismic source in a linear array of sources. Then, the measured reflectivity and travel time $T_w$ are converted to a three-point inverse distortion operator. The array of sources is then fired in three groups at a time sequence which produces this three-point operator. Firing of the second group of sources is delayed from the firing of the first group by the measured two-way travel time, and the firing of the third group of sources is delayed by twice the two-way travel time. The number of sources in each group is controlled by the measured reflectivity.

The foregoing and other objects, features, and advantages of the invention will be better understood from the drawings and the following more detailed description and appended claims.

DESCRIPTION OF THE PREFERRED EMBODIMENT

Figure 4:
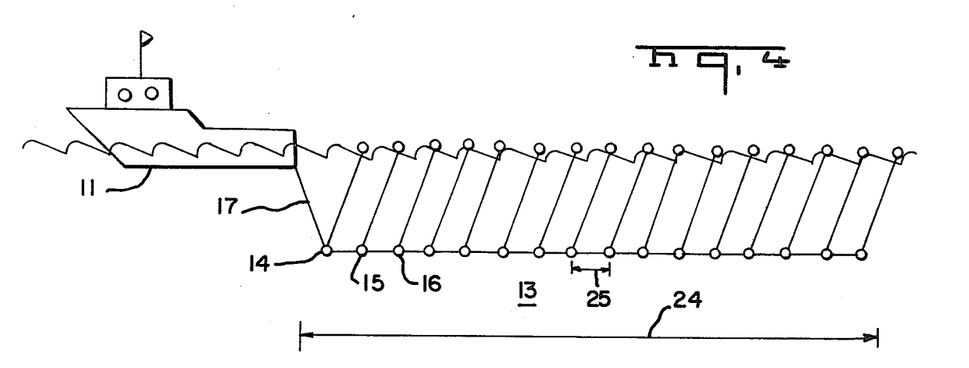
FIGS. 4 and 5 show a marine seismic exploration system.
Figure 5:
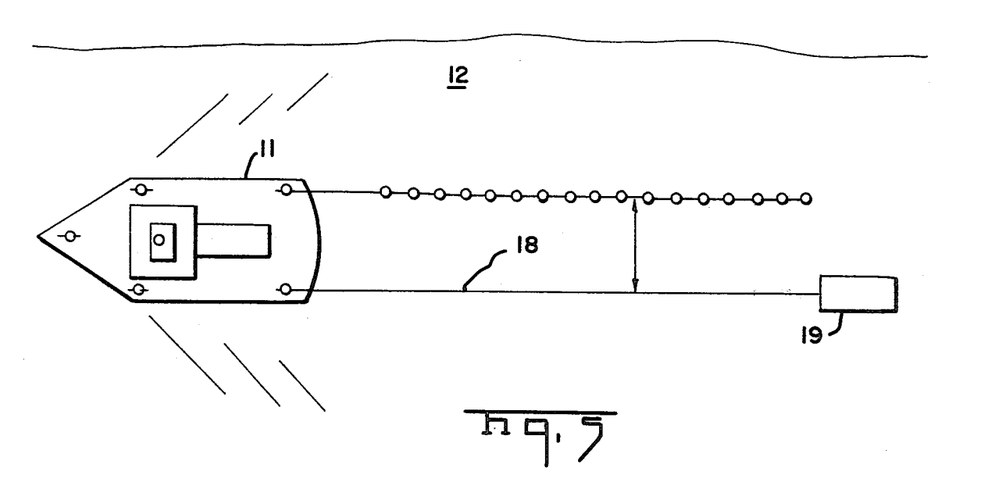

FIGS. 4 and 5 show a marine seismic exploration system. A vessel 11 traverses a seismic exploration path in surveying the subsurface formation 12 below the water layer 13. A linear horizontal array of seismic sources 14, 15, 16 and others is towed behind the boat by the cable 17. Surface floats help to maintain the equal spacing between the sources.

A hydrophone streamer 18 is also towed behind the boat. A surface support buoy 19 helps to maintain the proper relationship between the hydrophone streamer and the source array.

A seismic trace which is generated during seismic marine exploration by this system may be described mathematically as follows:

$$S(t) = B(t) * H(t) * R(t) + N(t) \qquad (1)$$

where,
S(t) = seismic trace,
B(t) = shot pulse,
H(t) = reverberation distortion,
R(t) = reflectivity function, and N(t) = noise.

Equation (1) states that the seismic trace is produced by the shot pulse convolved with the reverberation distortion convolved with the reflectivity, plus coherent and random noise. [Convolution is denoted by an asterisk (*)]. Convolution is the process of filtering. Consequently, the seismic trace is the result of the shot pulse being filtered by the reflectivity of the earth and by the reverberation distortion.

Basically, the reverberation distortion is a function of both the magnitudes and signs of the reflection coefficients, R, at the bottom of the water and at the water surface. The reverberations of the shot pulse are delayed equal time intervals relative to each other, and their amplitudes are successively reduced by these reflection coefficients. The reflection coefficient at the water bottom can be either positive (+) or negative (−) in sign depending on the nature of the water bottom, while the reflection coefficient at the water surface is always negative (−) and is assumed to be unity (−1). Further, each multiple pulse is reduced in amplitude from the previous one by the magnitude of the water bottom reflectivity R. Accordingly, a dereverberation operator can be described by the two-point operator i(t):

$$i(t) = \delta(t) + R\, \delta(t - T_w) \tag{2}$$

Figure 6:
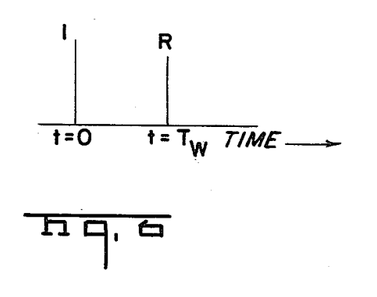
FIGS. 6–9 illustrate two- and three-point time domain inverse operators.
Figure 7:
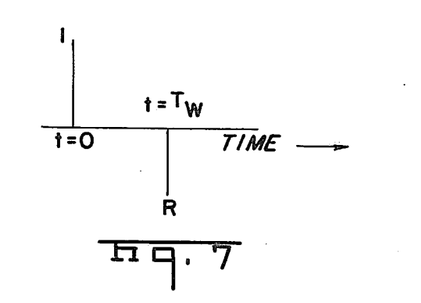

This operator, consisting of a first impulse of unity magnitude at t = 0 and a second impulse of magnitude R at t = $T_w$, can be illustrated in two forms. The first is shown in FIG. 6 for a positive water bottom reflection coefficient, +R. The second is shown in FIG. 7 for a negative water bottom coefficient, −R.

In those circumstances wherein the water bottom is relatively flat, the downward-going reverberation distortion at the shotpoint, and the upward-going reverberation distortion at the detector are approximately the same. Consequently, for a flat water bottom, a total dereverberation operator I(t) can be represented by the convolution of the two-point operator at the shotpoint, $i_s(t)$, with the two-point operator, $i_d(t)$, at the detector.

$$I(t) = i_s(t) * i_d(t) \tag{3}$$

$$= [\delta(t) + R\delta(t - T_w)] * [\delta(t) + R\delta(t - 2T_w)] \tag{4}$$

$$= \delta(t) + 2R\delta(t + T_w) + R^2\delta(t + T_w) \tag{5}$$

Figure 8:
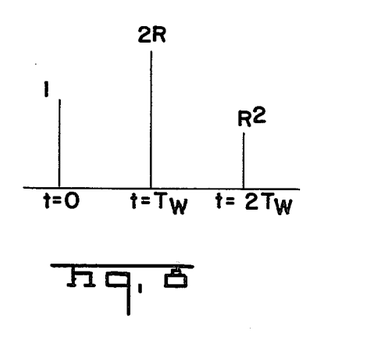
Figure 9:
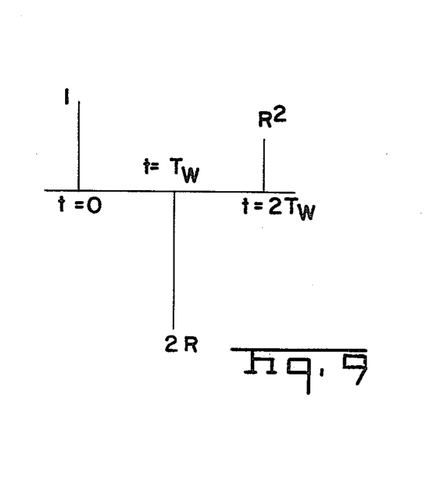

For the case of a positive water bottom reflectivity, +R, the dereverberation operator can be illustrated as in FIG. 8; while for a negative water bottom reflectivity, −R, the dereverberation operator can be illustrated as in FIG. 9. It can therefore be seen that the total dereverberation operator I(t) for a flat water bottom is a three-point operator consisting of three impulses — the first of unity magnitude at t = 0, the second of magnitude 2R at t = $T_w$, and the third of magnitude $R^2$ at t = $2T_w$.

By firing the sources in various groups, with different firing times for each group, the resultant acoustic pressure wave has the time domain characteristics depicted in FIGS. 8 and 9. As an example, the operator of FIG. 8 is generated by firing a first group of pulses at time t = 0. The amplitude of the pulse generated by this group is arbitrarily designated unity. A second group of pulses is fired at time $T_w$. The amplitude of the pulse produced by the second group is related to that of the first group by a factor 2R, where R is the reflectivity of the water bottom. A third group of pulses is fired at time $2T_w$. The amplitude of the pulse produced by the third group is related to the amplitude of the first pulse by a factor $R^2$. It can be shown that firing the sources in a sequence such as the foregoing produces suppressed reverberations.

In order to fire the array of sources in such a sequence, it is necessary to determine the reflection coefficient R and the two-way travel time $T_w$ of acoustic energy through the water depth. In accordance with this invention, R and $T_w$ are obtained from a conventional seismogram produced by the firing of at least one of the sources 14–16 and others simultaneously. The sources are then fired in groups which produce a three-point inverse distortion operator. The seismic energy of this inverse operator produces seismograms which are substantially free of reverberations.

Figure 10:
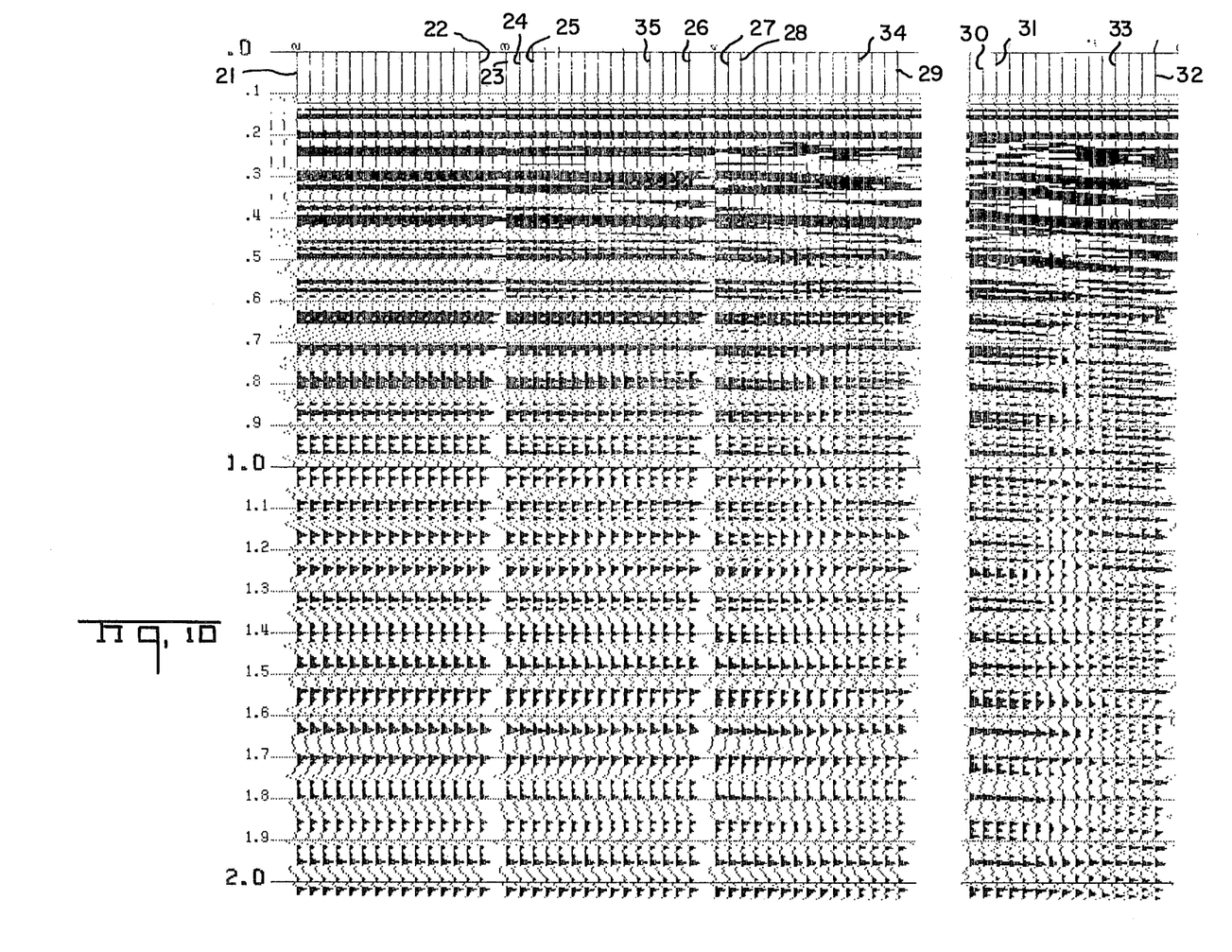
FIG. 10 depicts a conventionally produced seismogram combined with assumed values of R and $T_w$.

As one example of the manner in which R and $T_w$ can be determined from a conventional seismogram, consider FIG. 10. FIG. 10 depicts a conventional seismogram which has been combined, or stacked, in accordance with:

$$1,\ 2R,\ R^2 \text{ at } t = 0,\ T_w,\ 2T_w$$

for different assumed values of R and $T_w$. The seismic sections under the lines 21 ... 22 represent reflections detected by the geophones 18 as a function of time (ordinate) after the shot. The seismic sections under the lines 23–25 represent the same seismic sections stacked with an assumed reflectivity R = 0.1 and for various assumed values of $T_w$. The seismic section under the line 24 is the sum of the conventionally produced section plus the conventionally produced section weighted by a factor of 2(0.1) delayed by 96 msecs., plus the conventionally produced trace weighted by a factor of $(0.1)^2$ delayed by 192 msecs. The section under the line 25 is the sum of the conventionally produced trace weighted by the same factors but delayed by 98 msecs. and twice 98 msecs. The last section in this set under the line 26 is the sum of the conventionally produced trace weighted in the same manner but delayed by 120 msecs. and twice 120 msecs.

The sections under the lines 27–29 are combined, or stacked, sections with the same time delays, 94, 96 ... 120 msecs. but with an assumed reflectivity of R = 0.2. The sections under the lines 30, 31 and 32 are stacked sections with an assumed reflectivity of R = 0.5, and with the same time delays. The values of R and $T_w$ can be determined from such an analysis by selecting the values of R and $T_w$ which produce the minimum energy in a section. Visual analysis of FIG. 10 shows that the section 33 has the minimum energy therein. This indicates that a correct value of R is 0.5, and the correct value of $T_w$ is 114 msecs.

The values of R and $T_w$ can be automatically determined in this manner but a very large number of computer operations is required, and generally it is not practical to make such an analysis on shipboard.

FIG. 10 illustrates an important feature which makes possible a simplified process for determining R and $T_w$ on board the ship. This process, which is subsequently described, is the invention disclosed and claimed in copending application Ser. No. 844,549, filed Oct. 25, 1977, Allen et al. FIG. 10 shows that the correct value of $T_w$ can be determined for any assumed value of R. That is, the section 34 has the minimum energy in its set and this indicates a value of $T_w$ of 114 msecs. even though an incorrect value of R = 0.2 was used in the stacking. Similarly, the section 35 has the minimum energy in its set and this indicates a correct value of $T_w$ = 114 msecs. even though an incorrect value of R = 0.1 was used in the stacking. This phenomena is utilized by assuming a value of reflectivity in determining $T_w$. Then, reflectivity can be determined from the known value of $T_w$.

Figure 11:
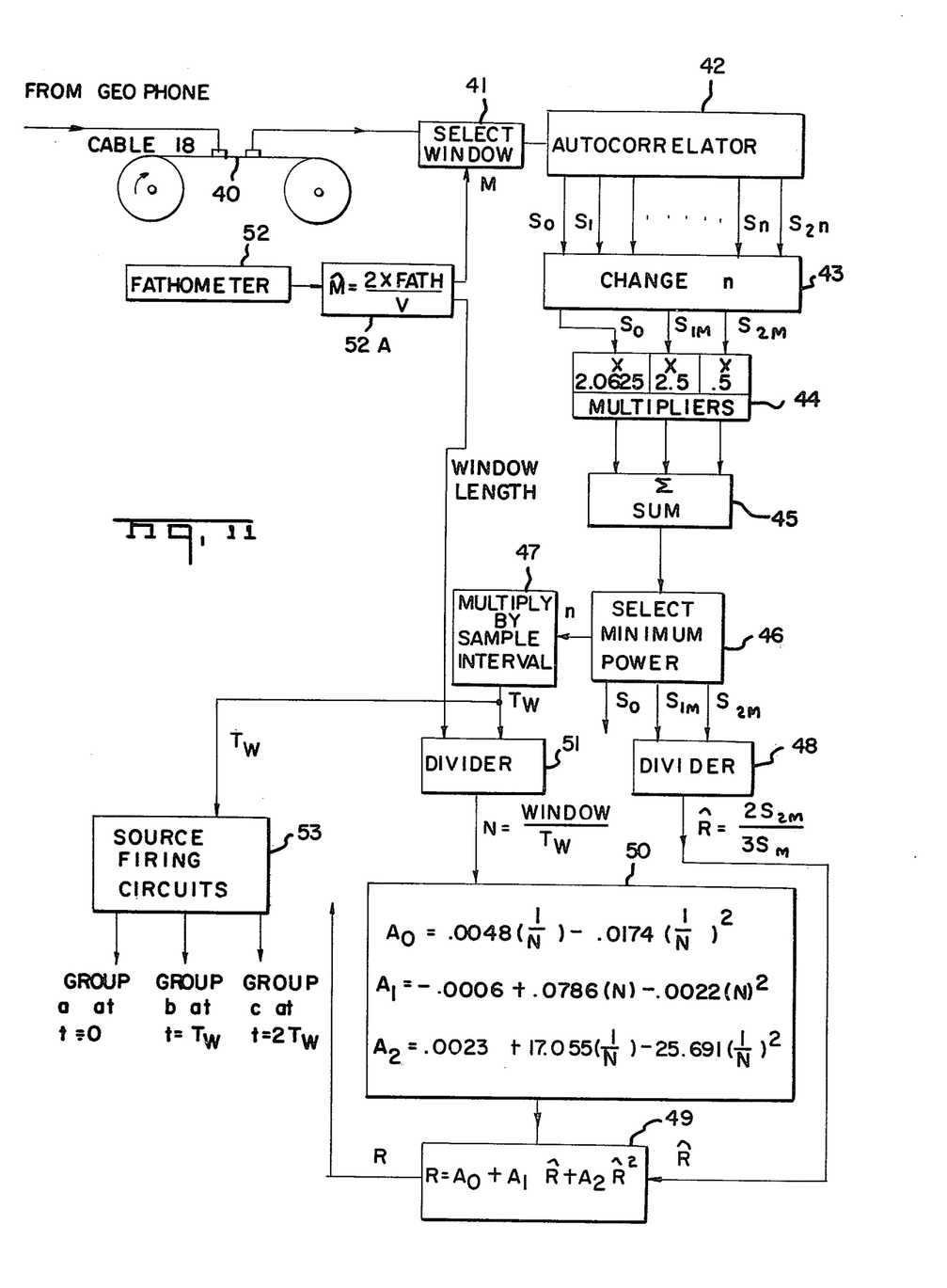
FIG. 11 depicts an example of a system for carrying out this invention.

FIG. 11 depicts one system for determining R and $T_w$ on board ship. A seismogram from a conventionally produced shot is recorded on magnetic tape 40 as is standard. A portion, or window of this seismogram is played back as indicated at 41. This window is auto-correlated by the auto-correlator 42.

Figure 12:
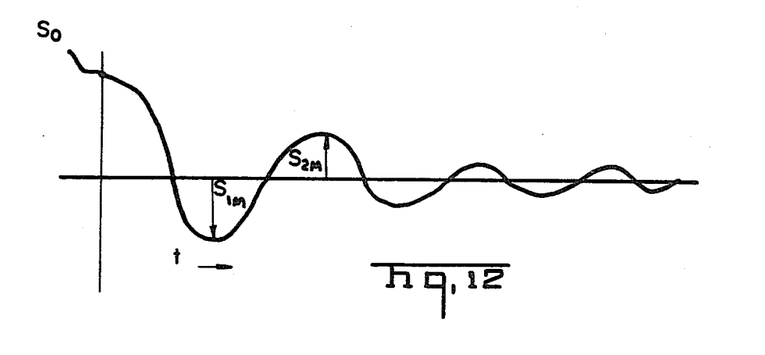
FIG. 12 shows the correlation function of a selected window.

The auto-correlation function is shown in FIG. 12. As is well known, auto-correlation requires the point-by-point multiplication of the samples in the window by themselves to produce a set of auto-correlation coefficients which are then summed to produce one point on the auto-correlation function of FIG. 12. Then, the window is time shifted, the samples are again multiplied one by the other and summed to form another point on the auto-correlation function. The process is repeated for various time shifts.

As an example, with zero time shift, the samples in the window are multiplied by themselves to produce the zero lag auto-correlation coefficients. These are summed to produce the value $S_0$ on the curve of FIG. 12. Then, the samples of the window are shifted by one time sample, multiplied one by the other to produce the coefficients at one time sample lag. These are summed to form another point on the correlation function of FIG. 12. In general, the window is shifted with respect to itself by a number of time samples designated n.

The zero lag auto-correlation coefficients $S_0$ are combined with the auto-correlation coefficients for a lag of n and for a lag of 2n for various values of n. The change in the value of n is indicated at 43 in FIG. 11. The combination takes place in the multipliers 44. The zero lag value $S_0$ is multiplied by 2.0625. The value of the correlation function at a lag of n is multiplied by 2.5 and the value at a lag of 2n is multiplied by 0.5. These products are summed at 45. The minimum power, that is, the least sum, in the combined auto-correlation functions is selected at 46. The minimum power sum specifies the correct n which is designated M.

Since M is in sample times, this can be directly converted to $T_w$ because the time per sample is known. For example, the sections of FIG. 10 have a sample interval of 2 msecs. Assuming that a minimum power in the combined auto-correlation coefficients is detected when n = 57, then the output of 47 is a $T_w$ of 114 msecs.

The determination of reflectivity is an improvement on the technique described in Pflueger, "SPECTRA OF WATER REVERBERATIONS FOR PRIMARY AND MULTIPLE REFLECTIONS," *GEOPHYSICS*, Vol. 37, No. 5 (October 1972), pp. 788–796. In that prior art technique, reflectivity is related to the ratio of the amplitude of the side lobes of the auto-correlation function occurring at multiples of $T_w$. This procedure provides a good estimate of reflectivity when the auto-correlation window is quite long. However, the use of a long auto-correlation window introduces other problems, notably the introduction of noise. It is for this reason that the window selected at 41 is a relatively short multiple of $T_w$.

The determination of reflectivity as illustrated in FIG. 11 makes use of the Pflueger technique to determine a first estimate $\hat{R}$. The divider 48 forms the ratio:

$$(2 S_{2M}/3 S_{1M})$$

where $S_{1M}$ is the determined value of the correlation function at $T_w$ and $S_{2M}$ is the value of the auto-correlation function at $2T_w$.

Figure 13:
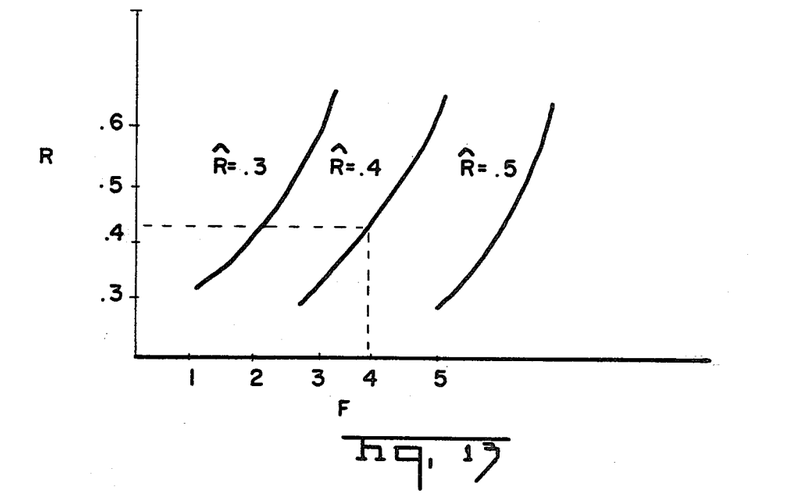
FIG. 13 depicts conversion from an estimated reflectivity to actual reflectivity.

It can be shown that the estimate $\hat{R}$ is related to true reflectivity R in the manner depicted in FIG. 13. F is the length of the correlation window in terms of the number of $T_w$'s which are included in the window. As an example, suppose the auto-correlation window extends from $3T_w$ to $7T_w$ and $\hat{R}$ is determined to be 0.4 from Pflueger's technique. Then, F = 4 and FIG. 13 shows that R is approximately 0.425. In actual practice, reference is not made to a graph like FIG. 13. Rather coefficients are stored in memory which are applied to the estimate $\hat{R}$ to convert it to the true value of R. The coefficients are $A_0$, $A_1$ and $A_2$ which are applied to $\hat{R}$ as indicated at 49.

The coefficients are a least squares fit to a surface described by plotting the true value of R as a function of N and the first estimate of R. Specifically, the coefficients are determined as indicated at 50. The value of F for this procedure is found by dividing the length of the window by $T_w$ as indicated at 51.

The length of the auto-correlation window, selected at 41, is a function of the two-way travel time as determined from the fathometer 52. The auto-correlation lag $\hat{M}$ is determined by dividing twice the fathometer reading by the velocity of sound in water, assumed to be 4800 feet per second. This ratio is determined at 52A. The length of the auto-correlation window is a multiple of the auto-correlation lag $\hat{M}$. Generally, a window extending from 5M to 15M for each trace will be suitable.

Having determined $T_w$ and R, the sources are fired in groups which produce the desired three-point operator. The sources are fired in three groups designated a, b and c. The a group is fired at time t = 0. Group b is fired at t = $T_w$, and group c is fired at t = $2T_w$. The firing circuits 53 for accomplishing this may be of the type shown in U.S. Pat. No. 3,687,218 — Ritter.

The number of sources in each group is determined by the value of R. If a, b and c denote the number of sources in each group, these numbers are related to the determined reflectivity by the following:

$a + b + c$ = total number of sources $b/a = 2R$ $c/a = R^2$

A typical array which has been used in practice includes forty sources which are designated by the numerals "1" through "40". In this example, four sources are used as spares and the sources are fired in the following groups:

if R = 0.3

(a,b,c) = (20,28,39)

a = 40,39,37,36,33,32,30,29,27,,23,22,19,18,13,12,10,9,7,4,3,1 b = 38,34,31,28,24,21,20,16,14,11,8,5,2 c = 25,17 if R = 0.4

(a,b,c,) = (23,26,38)

a = 40,38,36,33,31,29,27,23,22,19,18,13,11,9,7,4,3,1
b = 39,37,34,32,30,28,24,20,16,14,12,10,8,5,2
c = 25,21,17 if R = 0.5

(a,b,c) = (25,25,37)

a = 40,38,36,33,31,29,25,22,18,14,12,10,8,5,3,1
b = 39,37,34,32,30,27,23,21,19,17,13,11,9,7,4,2
c = 28,24,20,16 if R = 0.6

(a,b,c) = (27,24,36)

a = 39,37,34,32,28,24,23,19,12,11,9,7,4,2
b = 40,38,36,33,31,30,27,22,20,18,16,14,10,8,5,3,1
c = 29,25,21,17,13 if R = 0.7

(a,b,c) = (29,23,35)

a = 39,37,34,30,27,22,18,14,11,8,4,2
b = 40,38,36,33,31,29,25,23,21,19,17,13,10,9,7,5,3,1
c = 32,28,24,20,16,12 if R = 0.8

(a,b,c) = (30,23,34)

a = 39,37,32,31,28,23,19,16,11,7,3
b = 40,38,36,34,30,27,24,22,20,18,14,12,10,8,5,4,2,1
c = 33,29,25,21,17,13,9

Because R changes slowly as the vessel moves, R is not recomputed for each shot. Rather, an optimum value of R occurring over the subsurface length of the cable is used to control the number of sources in each group for the three-point operator shots.

Conventional analog or hard wired digital circuits may be used in implementing the invention. However, the preferred embodiment of the invention makes use of a small general purpose digital computer which is carried on board the vessel. One example of such a computer which has been successfully used is the Texas Instruments 980A computer.

In the specific example just described, the control parameters are the reflectivity and water depth which are used to control the firing of the sources in time domain operators. Another example is where the directivity of the array of sources is controlled from measurements of dip made from conventionally produced seismograms. My copending application Ser. No. 793,680, filed May 4, 1977, describes an example of this. The disclosure of that application is specifically incorporated herein.

While a particular embodiment has been shown and described, other modifications are within the true spirit and scope of the invention. The appended claims are, therefore, intended to cover such modifications.

I claim:

1. A method of seismic exploration comprising:
    firing at least one source in an array of seismic sources towed by a marine vessel,
    recording seismograms representing the reflected seismic pulses,
    measuring the water bottom reflectivity and water depth from said seismograms,
    converting the measurements of water bottom reflectivity and water depth into control parameters, and
    firing said array of seismic sources in accordance with said parameters and in sequential groups such that the seismic pulses combine to produce a resultant acoustic pressure wave having a time domain characteristic representative of the inverse of the reverberation distortion in the water layer between the water bottom and the water surface.

2. The method recited in claim 1 wherein the steps of firing said array of sources in sequential groups comprises:
    firing first, second, and third groups of said sources so that the leading edges of the pressure waves therefrom enhance each other to generate first, second, and third acoustic impulses into the water.

3. The method recited in claim 2 further comprising:
    controlling the amount of energy produced by said second and third groups of sources in proportion to the amount of energy produced by said first group of sources multiplied by factors related to the measured reflectivity of the water bottom.

4. The method recited in claim 3 wherein the amount of energy produced by said second group of sources is related to the amount of energy produced by said first group of sources by a factor of twice the measured water bottom reflectivity, and wherein the amount of energy produced by said third group of sources is related to the amount of energy produced by said first group of sources by the square of the measured reflectivity.

5. The method recited in claim 2 further comprising:
    delaying said second group of pulses after the first group of pulses by a time $T_w$ relating to the measured water depth, and
    delaying the firing of said third group of sources from the firing of said first group by an amount $2T_w$.

6. The method recited in claim 1 further comprising:
    controlling the number of sources fired in each group in accordance with the measured reflectivity.

* * * * *

UNITED STATES PATENT AND TRADEMARK OFFICE
CERTIFICATE OF CORRECTION

PATENT NO. : 4,146,871                                          Page 1 of 2

DATED : March 27, 1979

INVENTOR(S) : William H. Ruehle

It is certified that error appears in the above-identified patent and that said Letters Patent are hereby corrected as shown below:

The attached Columns 1 thru 4 should be inserted immediately following the title page.

THIS CERTIFICATE OF CORRECTION APPLYS TO THE GRANT, EXCLUSIVELY.

Signed and Sealed this

Sixteenth Day of October 1979

[SEAL]

Attest:

RUTH C. MASON
Attesting Officer

LUTRELLE F. PARKER
Acting Commissioner of Patents and Trademarks

DETERMINATION OF REFLECTIVITY AND WATER DEPTH FOR FIRING MARINE SOURCES AS AN INVERSE DISTORTION OPERATOR

CROSS REFERENCES TO RELATED APPLICATIONS

This application is a continuation-in-part of U.S. patent application Ser. No. 709,485, filed July 28, 1976, now abandoned, which in turn is a continuation-in-part of U.S. patent application Ser. No. 554,047, filed Feb. 28, 1975, and now abandoned.

BACKGROUND OF THE INVENTION

This invention relates to marine seismic exploration and more particularly to the use of parameters measured from conventionally produced seismograms to control the firing of an array of sources to produce seismograms with enhanced reflections.

In marine seismic exploration, seismic energy can be generated from a towed array of sources. The resultant acoustic pressure waves are reflected from the subsurface formations and recorded as seismograms. Unfortunately, the seismograms include distortion which obscures the characteristics of the subsurface formations. In marine exploration, this distortion is often severe. It includes water bottom multiples as depicted in FIG. 1 and reverberations as depicted in FIGS. 2 and 3.

As the initial shot pulse travels to the bottom of the water, it is partially transmitted and partially reflected by this boundary. This transmitted part is reflected by the discontinuity beneath the water to become a primary reflection. The reflected part bounces back to the surface where it is again reflected to the water bottom. Once more, part of this pulse passes through the boundary and part is reflected. The process continues indefinitely. Each time a pulse bounces between the surface and the bottom of the water, a pulse emerges from the boundary at the bottom to follow the initial pulse into the section. These multiple pulses are delayed equal time intervals relative to each other, and their amplitudes are successively reduced by the reflection coefficient at the bottom of the water. The net result of this is to produce a seismogram consisting of a single primary followed by a train of equally spaced multiples or reverberations.

In U.S. Pat. No. 3,689,874 to Foster et al there is described a method and apparatus for removing the reverberation distortion present in seismic data by an operation which separates the reverberation distortion component of the data from the component representing the characteristics of the subsurface formation. This operation is known as dereverberation and more particularly involves the obtaining of a dereverberation operator in the form of an inverse filter that is applied to the seismic data to produce a signal which approximates the signal which would have been produced by a desired shot pulse interacting with the reflectivity of the subsurface formation in the absence of the reverberation distortion.

While dereverberation has been successfully used on many marine seismograms, it is not effective in all areas. Particularly where the water bottom is hard, the reverberations are so severe that the complete dynamic range of the recording system is required just to faithfully record the reverberations. Accordingly, it is desirable to suppress the reverberations before recording.

SUMMARY OF THE INVENTION

This invention relates to marine seismic exploration wherein the characteristics of the medium through which the seismic energy travels are measured from conventionally produced seismograms. These measurements are converted into control parameters. When the sources are fired under control of these parameters, seismograms having enhanced reflections are produced.

More particularly, this invention relates to measuring the reflectivity of the water bottom and the two-way travel time $T_w$ directly from seismograms produced by conventional shooting of at least one seismic source in a linear array of sources. Then, the measured reflectivity and travel time $T_w$ are converted to a three-point inverse distortion operator. The array of sources is then fired in three groups at a time sequence which produces this three-point operator. Firing of the second group of sources is delayed from the firing of the first group by the measured two-way travel time, and the firing of the third group of sources is delayed by twice the two-way travel time. The number of sources in each group is controlled by the measured reflectivity.

The foregoing and other objects, features, and advantages of the invention will be better understood from the drawings and the following more detailed description and appended claims.

BRIEF DESCRIPTION OF THE DRAWINGS

FIG. 1 depicts water bottom multiples;

FIGS. 2 and 3 depict water reverberations;

FIGS. 4 and 5 show a marine seismic exploration system;

FIGS. 6–9 illustrate two- and three-point time domain inverse operators;

FIG. 10 depicts a conventionally produced seismogram combined with assumed values of R and $T_w$;

FIG. 11 depicts an example of a system for carrying out this invention;

FIG. 12 shows the correlation function of a selected window; and

FIG. 13 depicts conversion from an estimated reflectivity to actual reflectivity.

DESCRIPTION OF THE PREFERRED EMBODIMENT

FIGS. 4 and 5 show a marine seismic exploration system. A vessel 11 traverses a seismic exploration path in surveying the subsurface formation 12 below the water layer 13. A linear horizontal array of seismic sources 14, 15, 16 and others is towed behind the boat by the cable 17. Surface floats help to maintain the equal spacing between the sources.

A hydrophone streamer 18 is also towed behind the boat. A surface support buoy 19 helps to maintain the proper relationship between the hydrophone streamer and the source array.

A seismic trace which is generated during seismic marine exploration by this system may be described mathematically as follows:

$$S(t) = B(t) * H(t) * R(t) + N(t) \qquad (1)$$

where, $S(t)$ = seismic trace,
$B(t)$ = shot pulse,
$H(t)$ = reverberation distortion,
$R(t)$ = reflectivity function, and N(t) = noise.

Equation (1) states that the seismic trace is produced by the shot pulse convolved with the reverberation distortion convolved with the reflectivity, plus coherent and random noise. [Convolution is denoted by an asterisk (*)]. Convolution is the process of filtering. Consequently, the seismic trace is the result of the shot pulse being filtered by the reflectivity of the earth and by the reverberation distortion.

Basically, the reverberation distortion is a function of both the magnitudes and signs of the reflection coefficients, R, at the bottom of the water and at the water surface. The reverberations of the shot pulse are delayed equal time intervals relative to each other, and their amplitudes are successively reduced by these reflection coefficients. The reflection coefficient at the water bottom can be either positive (+) or negative (−) in sign depending on the nature of the water bottom, while the reflection coefficient at the water surface is always negative (−) and is assumed to be unity (−1). Further, each multiple pulse is reduced in amplitude from the previous one by the magnitude of the water bottom reflectivity R. Accordingly, a dereverberation operator can be described by the two-point operator i(t):

$$i(t) = \delta(t) + R\, \delta(t - T_w) \qquad (2)$$

This operator, consisting of a first impulse of unity magnitude at t = 0 and a second impulse of magnitude R at t = $T_w$, can be illustrated in two forms. The first is shown in FIG. 6 for a positive water bottom reflection coefficient, +R. The second is shown in FIG. 7 for a negative water bottom coefficient, −R.

In those circumstances wherein the water bottom is relatively flat, the downward-going reverberation distortion at the shotpoint, and the upward-going reverberation distortion at the detector are approximately the same. Consequently, for a flat water bottom, a total dereverberation operator I(t) can be represented by the convolution of the two-point operator at the shotpoint, $i_s(t)$, with the two-point operator, $i_d(t)$, at the detector.

$$I(t) = i_s(t) * i_d(t) \qquad (3)$$

$$= [\delta(t) + R\delta(t - T_w)] * [\delta(t) + R\delta(t - 2T_w)] \qquad (4)$$

$$= \delta(t) + 2R\delta(t + T_w) + R^2\delta(t + T_w) \qquad (5)$$

For the case of a positive water bottom reflectivity, +R, the dereverberation operator can be illustrated as in FIG. 8; while for a negative water bottom reflectivity, −R, the dereverberation operator can be illustrated as in FIG. 9. It can therefore be seen that the total dereverberation operator I(t) for a flat water bottom is a three-point operator consisting of three impulses — the first of unity magnitude at t = 0, the second of magnitude 2R at t = $T_w$, and the third of magnitude $R^2$ at t = $2T_w$.

By firing the sources in various groups, with different firing times for each group, the resultant acoustic pressure wave has the time domain characteristics depicted in FIGS. 8 and 9. As an example, the operator of FIG. 8 is generated by firing a first group of pulses at time t = 0. The amplitude of the pulse generated by this group is arbitrarily designated unity. A second group of pulses is fired at time $T_w$. The amplitude of the pulse produced by the second group is related to that of the first group by a factor 2R, where R is the reflectivity of the water bottom. A third group of pulses is fired at time $2T_w$. The amplitude of the pulse produced by the third group is related to the amplitude of the first pulse by a factor $R^2$. It can be shown that firing the sources in a sequence such as the foregoing produces suppressed reverberations.

In order to fire the array of sources in such a sequence, it is necessary to determine the reflection coefficient R and the two-way travel time $T_w$ of acoustic energy through the water depth. In accordance with this invention, R and $T_w$ are obtained from a conventional seismogram produced by the firing of at least one of the sources 14–16 and others simultaneously. The sources are then fired in groups which produce a three-point inverse distortion operator. The seismic energy of this inverse operator produces seismograms which are substantially free of reverberations.

As one example of the manner in which R and $T_w$ can be determined from a conventional seismogram, consider FIG. 10. FIG. 10 depicts a conventional seismogram which has been combined, or stacked, in accordance with:

$$1, 2R, R^2 \text{ at } t = 0, T_w, 2T_w$$

for different assumed values of R and $T_w$. The seismic sections under the lines 21 ... 22 represent reflections detected by the geophones 18 as a function of time (ordinate) after the shot. The seismic sections under the lines 23–25 represent the same seismic sections stacked with an assumed reflectivity R = 0.1 and for various assumed values of $T_w$. The seismic section under the line 24 is the sum of the conventionally produced section plus the conventionally produced section weighted by a factor of 2(0.1) delayed by 96 msecs., plus the conventionally produced trace weighted by a factor of $(0.1)^2$ delayed by 192 msecs. The section under the line 25 is the sum of the conventionally produced trace weighted by the same factors but delayed by 98 msecs. and twice 98 msecs. The last section in this set under the line 26 is the sum of the conventionally produced trace weighted in the same manner but delayed by 120 msecs. and twice 120 msecs.

The sections under the lines 27–29 are combined, or stacked, sections with the same time delays, 94, 96 ... 120 msecs. but with an assumed reflectivity of R = 0.2. The sections under the lines 30, 31 and 32 are stacked sections with an assumed reflectivity of R = 0.5, and with the same time delays. The values of R and $T_w$ can be determined from such an analysis by selecting the values of R and $T_w$ which produce the minimum energy in a section. Visual analysis of FIG. 10 shows that the section 33 has the minimum energy therein. This indicates that a correct value of R is 0.5, and the correct value of $T_w$ is 114 msecs.

The values of R and $T_w$ can be automatically determined in this manner but a very large number of computer operations is required, and generally it is not practical to make such an analysis on shipboard.

FIG. 10 illustrates an important feature which makes possible a simplified process for determining R and $T_w$ on board the ship. This process, which is subsequently described, is the invention disclosed and claimed in copending application Ser. No. 844,549, filed Oct. 25, 1977, Allen et al. FIG. 10 shows that the correct value of $T_w$ can be determined for any assumed value of R. That is, the section 34 has the minimum energy in its set and this indicates a value of $T_w$ of 114 msecs. even